United States Patent [19]

Thurmond, Jr.

[11] 4,166,516

[45] Sep. 4, 1979

[54] ADJUSTABLE CASTER

[75] Inventor: Elmer T. Thurmond, Jr., Miami, Fla.

[73] Assignee: Equipment Company of America, Hialeah, Fla.

[21] Appl. No.: 868,376

[22] Filed: Jan. 10, 1978

[51] Int. Cl.2 .......................... E04G 3/16; B60B 33/04

[52] U.S. Cl. .......................................... 182/15; 16/19; 16/44

[58] Field of Search ........................ 182/15; 16/19, 44

[56] References Cited

U.S. PATENT DOCUMENTS

| | | | |
|---|---|---|---|
| 1,271,559 | 7/1918 | Feebusch et al. | 16/19 X |
| 1,944,185 | 1/1934 | Langer | 16/19 X |
| 2,176,551 | 10/1939 | Solem | 16/44 |
| 2,425,675 | 8/1947 | Graft | 16/19 |
| 3,112,010 | 11/1963 | Mihalik | 182/15 X |
| 3,245,363 | 4/1966 | Amthor, Jr. et al. | 182/15 X |

*Primary Examiner*—C. J. Husar
*Assistant Examiner*—Conrad Berman
*Attorney, Agent, or Firm*—Jack E. Dominik

[57] ABSTRACT

A spring loaded, adjustable caster is disclosed which is used in combination with a rolling ladder. The adjustable caster comprises a wheel, a wheel mount for mounting the wheel, a longitudinal adjustable shank including a connecting rod having a threaded bore and a threaded shaft disposed in screwthreaded engagement with each other, whereby the length of the longitudinal adjustable shank may be varied. A jam nut is disposed in threadingly fitted engagement on the threaded shaft intermediate to the connecting rod and the wheel mount, whereby the jam nut may be rotated into a biasing relationship to the connecting rod. The caster further includes a sleeve adapted for sliding support of the connecting rod and with a spring disposed within the sleeve to provide a compressed relationship between the sleeve and the connecting rod. The sleeve is then mounted on a rolling ladder. Also, disclosed is a rolling ladder including a rectangular base with an adjustable caster disposed in each of the corners thereof, and a ladder leg disposed adjacent to each of the adjustable casters. Each of the ladder legs are in pre-determined spaced-apart relationship. When the ladder is empty, the casters engage the floor. When the ladder is loaded, the weight of the load compresses the caster and the legs then engage the floor. Each individual caster can be adjusted to provide for uniform engagement of the floor when the ladder is loaded and uniform clearance from the floor when not stood upon.

16 Claims, 3 Drawing Figures

ADJUSTABLE CASTER

FIELD OF THE INVENTION

The present invention relates to spring loaded casters, and more specifically, to spring loaded casters used to support rolling ladders, and to a method of optionally adjusting the same.

DESCRIPTION OF THE PRIOR ART

The present state of the art recognizes the utilization of spring loaded casters to carry the tare weight or dead weight of a ladder, making the same movably positionable when not being stepped on. Additionally, these prior art ladder devices attempt to achieve the object of allowing a plurality of legs to be brought into supporting contact with the underlying floor when the ladder is stepped on, thereby striving to achieve a stable and safe base for the ladder which would otherwise be free to roll on the casters. Generally, these prior art ladder devices have a base comprising a rectangular frame having rigidly mounted in each corner thereof a spring loaded caster. Normally, a leg is mounted immediately adjacent to each caster, with such leg being disposed in a predetermined spaced-apart relationship from the floor when the ladder is not being stood upon. When the ladder is being stood upon, the increased downward force on the spring loaded casters allows the legs to engage the floor, providing the above-described stabilizing support.

The first disadvantage of the prior art ladder structures is that the same spring loaded casters are used for a variety of ladder sizes which have varying tare weights running from as little as five to ten pounds to over 100 pounds. In that the predetermined clearance of the legs above the floor is relatively small, frequent problems are encountered. For instance, when the heavier ladders are used, it is a common occurrence for the legs to engage the floor when the ladder is not being stood upon, hampering manual movement of the same. Likewise, when the lighter ladders are used, the weight of standing upon the same may be insufficient for proper engagement of the legs with the floor, therefore failing to provide stable support for the user.

Yet another commonly incurred problem of the prior art ladder structures is that in the construction, machining and welding of the same on a mass production basis, extremely inaccurate tolerances result so that the clearance of the casters relative to the floor may be insufficient for proper operation. Additionally, the clearances of each individual caster relative to the other casters on the same ladder structure may differ substantially. This leads to the problem of in use operation of having one or more legs not providing the above-described supporting contact with the floor. This particular problem becomes of particular concern when the leg construction, as found in the majority of prior art structures, consists of bending a metal beam portion 90° to form a downward facing leg from a beam having the majority of its length in a horizontal plane.

All of these above problems are magnified by the utilization of the prior art ladder structures on a floor having a carpeted surface. Generally, the casters will sink into the carpet, decreasing the clearance between the casters and the outer most extremities of the carpet. This leads to the carpet more readily catching the legs and hampering the mobility of the ladder.

At the present the equipment industry has been unable to overcome the problems, and the use of ladder devices having movable capabilities along with stable features when in use has been greatly curtailed. Accordingly, it can readily be seen that there is a need in the industry for a ladder structure utilizing spring loaded casters that can overcome the above described problems, while being simple in design, inexpensive to manufacture, yet being structured efficiently to be durable under continued use with adverse conditions. Such a device must allow for ladder constructions that have wide tolerances that are necessitated by the need for a ladder which is relatively inexpensive to manufacture.

SUMMARY

The present invention is directed to a spring loaded, adjustable caster to be used for supporting a movably positionable structure. The adjustable caster comprises a rotatable wheel and a wheel mount for movably mounting in axial relationship the rotatable wheel. A longitudinal adjustable shank is attached to the wheel mount for varying the longitudinal displacement of the rotatable wheel relative to the movably positionable structure. The longitudinal adjustable shank includes a connecting rod and a shaft disposed in screwthreaded engagement with the connecting rod whereby the length of the longitudinal adjustable shank may be varied. A jam nut threadingly biases the connecting rod relative to the shaft so as to lock the longitudinal adjustable shank into a given longitudinal length. The shaft has a threaded exterior surface and the connecting rod has a threaded bore dimensioned and configured to receive the shaft. The jam nut is disposed in screwthreaded relationship to the threaded shaft whereby the jam nut may be rotated into biasing relationship to the connecting rod. A head member is rigidly attached to the lower portion of the threaded shaft which provides means for rotating the shaft relative to the connecting rod. Additionally, flat indentations are provided on the connecting rod to facilitate this relative rotation of the shaft with respect to the connecting rod.

The present invention is also directed to the combination of the above-described spring loaded adjustable casters and a rolling ladder, such rolling ladder including a base with at least three adjustable casters mounted on the base. The rolling ladder further includes a companion leg for support of the rolling ladder disposed adjacent to each of the adjustable casters. Each of the legs are disposed in a predetermined spaced-apart relationship when the ladder is not stood upon and in supporting engagement with the underlying floor upon which the rolling ladder rest when the same is stood upon.

The present invention is also directed to a method of leveling the rolling ladder by utilization of a plurality of adjustable casters. The method includes the steps of adjusting the longitudinal adjustment shank on each of the casters to provide initial clearance between the floor supporting the ladder and the lower extremity of the adjacent leg when the casters are supporting only the tare weight of the ladder. The next step includes applying a downward force to the ladder equivalent to stepping on the same, and then measuring the clearance between each leg and the floor while the downward vertical force is being applied to the ladder. If there exists a clearance while the downward vertical force is being applied, further adjusting of the longitudinal shanks is undertaken in an amount substantially equal to the clearance measured while applying the downward vertical force.

A primary object of the present invention is to provide a spring loaded, adjustable caster for which the spacial disposition of the caster's wheel can be varied relative to the supporting structure to which the caster is mounted.

Another object of the present invention is to provide a rolling ladder utilizing a plurality of spring loaded, adjustable casters.

A related and more specific object of the present invention is to provide a rolling ladder using adjustable casters so that the varying tare weights of ladders, which vary from 5 to 10 pounds up to over 100 pounds, may be properly compensated for by adjusting individual casters.

Another related and more specific object of the present invention is to provide a rolling ladder utilizing adjustable casters in which the varying clearances of the ladder legs from the floor due to varying manufacturing tolerances in the welding and bending of the legs can be compensated for by adjusting the longitudinal lengths of the casters.

Yet another specific object of the present invention is to provide a rolling ladder utilizing spring loaded, adjustable casters to be operable on carpeted floors in which the casters are likely to sink into the carpet.

Still another object of the present invention is to provide a method of leveling a ladder which utilizes a plurality of casters with adjacent legs.

A related and more specific object of the present invention is to provide a method of leveling a ladder where by the ladder legs are disposed in predetermined spaced-apart relationship to the floor when not stood upon and disposed in supporting engagement with the floor when stood upon.

A related and more specific object of the present invention is to provide a method of leveling a ladder where the end result is that all the ladder's legs have substantially identical clearances from the floor when the ladder is not being stood upon and all the legs properly engage the floor when being stood upon.

DESCRIPTION OF THE DRAWINGS

Further objects and advantages of the present invention will become apparent as the following description proceeds, taken in conjunction with the accompanying drawings in which.

DETAILED DESCRIPTION OF THE PREFERRED EMBODIMENT

The present invention is illustratively embodied in a spring-loaded caster, generally indicated as 2, designed to primarily be used with a rolling ladder, generally indicated as 4. However, it is contemplated that the casters of the present invention can be utilized with rolling structures other than the ladder 4.

Figure 3:
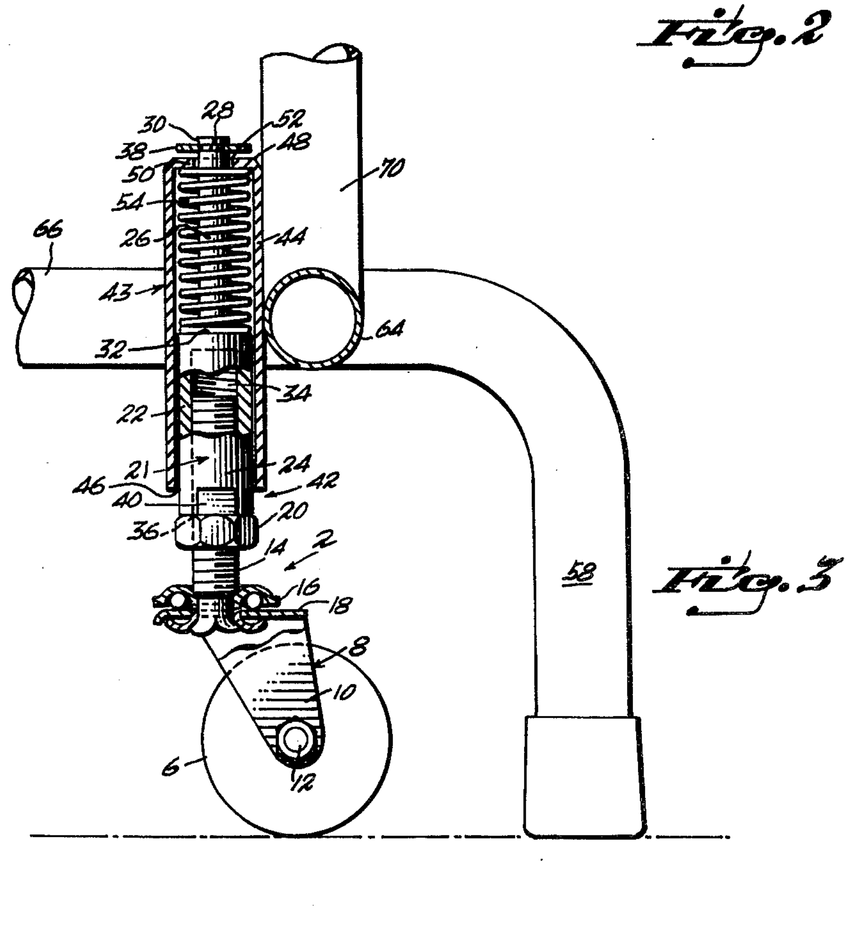
FIG. 3 is a partially broken away, segment view of the caster with the leg of the ladder engaging the floor.

As shown in FIG. 3, the caster 2 includes a rotatable wheel 6 mounted for movable rotational engagement of the floor, not shown, by means of a wheel mount 8. The wheel mount 8 includes a downwardly depending two prong extension portion 10 disposed for partially surrounding relationship to the rotatable wheel 6. The wheel mount 8 further includes an axle pin 12 mounted in traverse relationship in the outer extremities of the extension portion 10, providing an axle mount for the rotatable wheel 6. The upper portions of the wheel mount 8 includes an elongated threaded shaft rotatably secured to the wheel mount 8 for rotational movement above its longitudinal axis. A hex head portion 16 is situated at the junction of the wheel mount 8 and the threaded shaft 14 and is rigidly attached to the lower portion of the threaded shaft 14. Additionally, disposed frictional engagement between the upper flat surface 18 of the wheel mount 8 and the hex head portion 16 is a plurality of ball bearings positioned in a circular arrangement with the threaded shaft 14 being centrally and axially located relative to this circular arrangement. By virtue of this arrangement, rotation of the hex head portion 16 results in corresponding rotation of the threaded shaft 14, allowing the wheel mount 8 with its associated rotatable wheel 6 to substantially maintain a stationary position. Likewise, the wheel mount 8 and associated rotatable wheel 6 can rotate about the vertical axis of the threaded shaft 14 while the threaded shaft 14 and the associated hex head portion 16 remains substantially stationary. The caster 2 further comprises a jam nut 20 which threadingly engages the threaded shaft 14, thereby providing an adjustable positioning of the same along the longitudinal axis of the threaded shaft 14.

With reference to FIG. 3, the caster 2 further includes a connecting rod 22 having an enlarged cylindrical body portion 24 and a cylindrical extended neck portion 26 integrally formed at one end of the enlarged body portion 24. Since the body portion 24 has a larger cross-sectional configuration than the neck portion 26, a shoulder portion is defined therebetween. A threaded bore is concentrically formed in the body portion 24, with the threaded bore 34 defining an opening 36 at the end of the body portion 24 opposite the shoulder portion 32. This bore 34 is threaded to receive in screwthread engagement the threaded shaft 14. Toward the outermost end of the neck portion 26 is an integrally formed grove 28 which defines a ridge 30 on the outer most extremity of the neck portion 26. This grove is dimensioned and configured to receive a fastener 38, ideally in the form of a U-shaped clamp. The purpose of this locking structure will become apparent later in the description of the caster 2, but it should be appreciated at this point that other locking arrangements can also be utilized, such as threading the end of the neck portion 26 for threaded engagement with a nut, not shown in the drawings. Diametrically positioned on opposite sides of the body portion 24 is, ideally, a pair of compressed areas or flat indentations 40, dimensioned and aligned for receiving an implement such as a wrench. Engagement of the body portion 24 by a wrench allows for the rotation of the same about its longitudinal axis along the threaded shaft 14. Therefore, in this manner the longitudinal disposition of the connecting rod 22 relative to the threaded shaft 14 is adjustable. The jam nut 20 acts as a counteracting bias so as to prevent any further threading rotation of the connecting rod 22 downward. By virtue of the interacting cooperative relationship of the connecting rod 22 and the jam nut 20, the distance to which the connecting rod 22 can be rotated downward will be directly proportioned to the longitudinal disposition to the jam nut 20. Furthermore, the connecting rod 22 and the threaded shaft 14 defines a longitudinal adjustable member 42, the complete significance of which will be made clearer when the operation of the caster is hereinafter explained.

Figure 2:
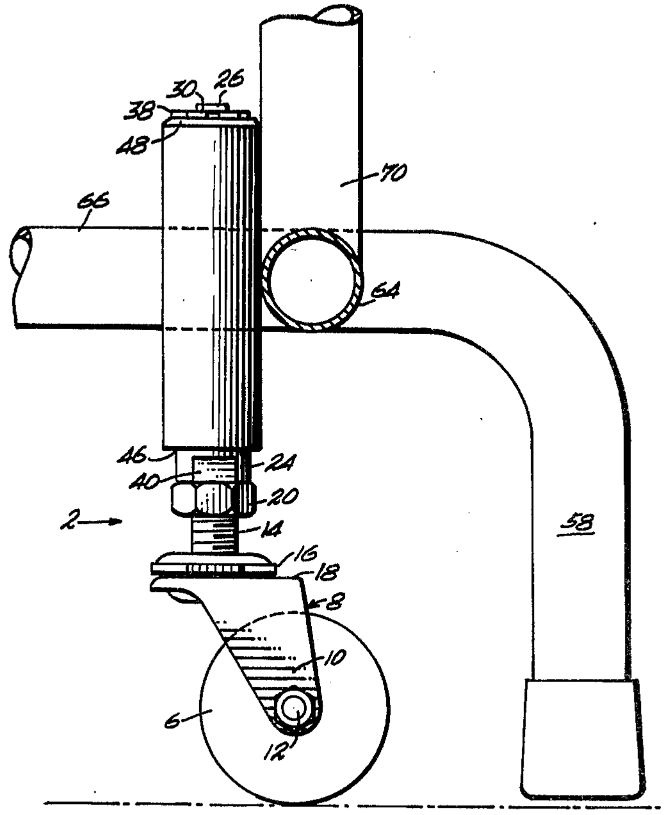
FIG. 2 is a segment view of the caster with the leg of the ladder being in spaced-apart relationship to the floor.

As shown in FIGS. 2 and 3, the caster 2 further includes a cylindrical sleeve 44 having an open end 46 and a constraint end 48 defined by a cap portion 50 integrally formed on the cylindrical sleeve 44 with a neck receiving aperture 52 centrally situated in the cap portion 50.

When assembled, the cylindrical sleeve 44 is disposed in surrounding encasing relationship to the connecting rod 22, with the upper region of the neck portion 26 protruding out of the constraint end 48 of the cylindrical sleeve 44 through the neck receiving aperture 52. The fastener 38 is disposed in locking engagement with the groove 28 of the neck portion 26 so as to prevent the neck portion 26 from slipping inwardly into the interior of the cylindrical sleeve 44. Prior to the positioning of the neck portion 26 through the neck receiving aperture 52, a bias element 54, preferably a spring, is positioned over the neck portion 26. The spring has a helical configuration defining a cross-sectional area which permits it to slip over the neck portion 26, while having outer dimensions sufficient to fit within the cylindrical sleeve 44. Additionally, the spring is dimensioned and configured so as to have one end thereof to engage and bias against the shoulder portion 32 of the connecting rod 22. When the cylindrical sleeve 44 is assembled over the top of the neck portion 26, the spring provides compression between the shoulder portion 32 and the inner surface of the constraint end 48 of the sleeve 44. Next, the jam nut 20 is threadingly disposed over the thread portion 14, followed by the threaded engagement of the connecting rod 22 to the threaded shaft 14. This provides linkage between the cylindrical sleeve 44 and the rotatable wheel 6. Additionally, the cylindrical sleeve is rigidly mounted, by welding or like connecting methods, to the structure in which it supports. In the preferred embodiment this structure is a rolling ladder 4.

In operation, the caster, under light loads applied to the cylindrical sleeve 44, has a distance between the shoulder portion 32 and the constraint end 48 substantially near the maximum possible distance. As greater loads are applied to the cylindrical sleeve 44, further compression is applied to the bias element or spring 54, leading to some travel in the spring 54. The increase in the downward applied force on the cylindrical sleeve 44 therefore results in a decrease in distance between the cylindrical sleeve 44 and therefore the supported structure and the lower extremity of the rotatable wheel 6. Generally, the spring adds a maximum amount of travel which will be incurred when the compression reaches a certain point. Ideally, the outer dimensions of the jam nut 20 are less than the inner dimensions of the open end 46 of the cylindrical sleeve 44, so that if the cylindrical sleeve is compressed far enough downward, the cylindrical sleeve 44 would slip over the jam nut 20. However, ideally, the maximum travel of the spring 54 should be such that it is less than the travel required for the cylindrical sleeve 44 to slip over the jam nut 20. By virtue of the above-described relationships, the spring 54 ideally becomes determinative of the maximum travel of the caster 2.

Figure 1:
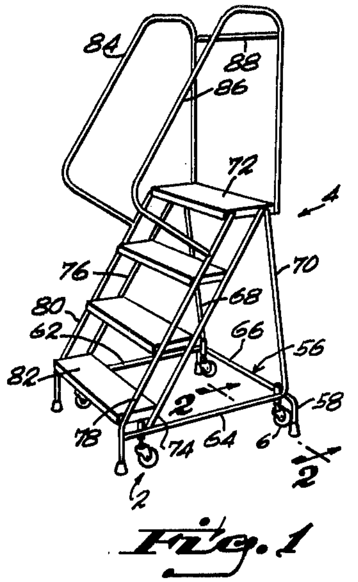
FIG. 1 is a perspective view of the casters mounted on the ladder.

As shown in FIG. 1, the caster 2 heretofore described, is used in combination with a rolling ladder 4. As previously mentioned, it is contemplated that the novel caster structure of the present invention can be used in combination with other sliding or movably positionable structures having similar problems as the ladder structure such as a worktable or racks for stock. The specific construction of the rolling ladder 4 may be of a conventional design and per se forms no part of the present invention. It is the cooperative relationship between the casters 2 of the present invention with the rolling ladder in which the novelity resides. Generally, the rolling ladders 4 which utilize the casters 2 can have any number of steps, ranging from 1 to 12 or more, in addition to having different constructions and configurations. The ladder 4 shown in FIG. 1 was choosen from numerous possible embodiments of the ladder for the purposes of illustration, without any intent to limit the invention to the specific construction of the illustrated ladder. Normally, ladders of the type shown in FIG. 1, have a rectangular base 56, normally with a caster 2 rigidly mounted by the sleeve 44, by welding or other means, to each of the corners thereof. Immediately positioned adjacent to each of the casters 2 is a leg 58, ideally having a rubber cap mounted on the extremity thereof. In the preferred embodiment, the rectangular base 56 includes side beams 62 and 64, which are disposed in spaced-apart parallel relationship and interconnected by traversing beam 66. The two opposed ends of traversing beam 66 are, ideally, bent at 90° at their opposed extremities, thereby defining a pair of legs 58. As has been previously discussed, this bending process results in wide tolerances in the clearance of such legs 58. In the illustration of FIGS. 2 and 3, the sleeve 44 is secured to the junction of the side beams 62 and 64 with the traversing beam 66, preferably by welding. A pair of angle supports 68 and 70 extend upwardly and are attached to a platform 72. On the opposite ends of the side beams 62 and 64 relative to the traversing beam 66, two sets of forward supports 74 and 76, and 78 and 80 are angularly positioned. The pair of forward supports 78 and 80, which are the outer pair, have a lower extended portion which are bent to define another pair of vertically arranged legs 58. A plurality of steps 82 are positioned inwardly of the forward supports 74 through 80 and rigidly secured to the same. In the preferred embodiment, the first step of the plurality of steps 82 is situated outwardly from the forward pair of legs 58. A pair of handrails are provided with a strut 88 therebetween. In summary, the ladder structure heretofore described, with the exception of the novel casters, and the concept of utilizing the same with the ladder, is commercially available.

Although the ladder of the preferred embodiment is shown with a rectangular base 56 having four casters 2, other base configurations with more or less casters could be combined with the present invention. For example, the prior art ladders having triangular bases with three casters could be combined with the present invention.

In operation, as depicted in FIG. 2 the caster 2 and rolling ladder 4 combination would allow for the legs 58 to be disposed in predetermined space-apart relationship from the floor, when not stood upon. As shown in FIG. 3, when the ladder 4 is stood upon, the legs 58 are disposed in supporting contact with the floor. The clearance of the legs 58 from the floor when having only the tare weight of the ladder applied to the casters provides for the ladder 4 to be movably positioned about the floor. Likewise, when placed in a fixed position and stood upon, the legs 58 properly engage the floor. Due to the varying clearances of each individual leg 58 relative to the floor, adjustment of each individual leg 58 can be accomplished by virtue of the caster construction previously described. More specifically, with the assembled caster 2, one wishes to increase the clearance of a specific leg 58, the longitudinal adjustment member 42 of the caster 2 mounted immediately adjacent to the specific leg 58 should be extended. Extension is accomplished by initially rotating the connecting rod 22 upward along the threaded shaft 14 by engaging the hex head portion 16 with a first implement or tool and the flat indentations 40 of the connecting rod 22 and rotating the two implements in opposite directions, and in such a direction as to have the connecting rod move upward on the shaft 14. Subsequently, the jam nut 20 is moved upward on the threaded shaft 14 to abuttingly engage the connecting rod 22 to provide bias. To decrease the clearance of the leg 58 relative to the floor, the jam nut 20 is rotated downwardly on the shaft 14, followed by the subsequent manipulation of downwardly rotating the connecting rod 22, in a manner previously described.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

METHOD

The method of leveling a ladder 4 contemplates the steps of initially adjusting the longitudinal adjustment shank 21 of each of the casters 2 to provide an initial clearance between the floor supporting the ladder 4 and the lower extremities of the adjacent leg 58. During this initial adjustment, the casters 2 should be supporting only the tare weight of the ladder 4 without any additional downward applied force. The next step is the applying of a downward vertical force on the ladder 4 equivalent to having a person step on the same. This can be accomplished either by applying weights of equivalent force on the appropriate steps 82, or actually having a person step on the ladder. The next step is to measure the clearance on each leg 58 and the floor while the downward vertical force is being applied to the ladder. If there is no clearance, then the leg is properly engaging the floor and therefore supporting the ladder and requires no further adjustment. On the other hand, if there still remains a clearance between any of the legs in the floor, the next step is to continue adjusting the longitudinal adjustment shanks 21 to either extend the leg failing to engage the floor or to withdraw those legs engaging the floor for the end result of having all legs evenly engage the floor. This involves a process of adjusting various combinations of the longitudinal adjustment shanks 21 and subsequently checking for proper engagement with the floor by applying a vertical force. It should be appreciated at this point that some degree of adjustment of the ladder to compensate for initial inaccuracy in tolerances of creating the legs can be undertaken at the point of manufacturing or distributing of the same, prior to the customer receiving the ladder. Likewise, the customer can further adjust the ladder for his own special problems and specific situations. The step of adjusting the longitudinal adjustment shank 21 includes the step of rotating the shaft 14 attached to the caster wheel 6 relative to the connecting rod 22 mounted by the attachment means 45 to the rolling ladder 4. The adjusting step further includes locking the shaft 14 in a fixed disposition relative to the connecting rod 22 by rotating on the shaft 14 a jam nut 20 into a biasing relationship with the connecting rod 22.

What is claimed is:

1. An adjustable caster assembly for supporting a loadable movably positionable structure comprising:

a rotatable wheel, a wheel mount for axially supporting in rotatable relationship said rotatable wheel, a shaft revolvably mounted to said wheel mount, external adjustment means for rotating said shaft relative to said wheel mount, a connecting rod disposed in screw-threaded engagement with said shaft, a sleeve adapted for sliding engagement with said connecting rod, a bias element disposed interiorly of said sleeve to provide spring-like compression between said sleeve and said connecting rod, when the caster assembly is under load, said sleeve fixedly attached to the loadable movably positionable structure, the relative spatial disposition of the connecting rod and the sleeve being fixed under no load conditions, the relative spatial disposition of the connecting rod and the sleeve being fixed when the shaft is rotated relative to the connecting rod, thereby effecting longitudinal displacement of the rotatable wheel, in the absence of bias element resistance, said external adjustment means disposed in spatial proximity with said wheel mount, whereby rotation of said shaft relative to said connecting rod effects the longitudinal adjustment of said caster while the position of the bias element remains uneffected, whereby said external adjustment means allows the longitudinal adjustment of the caster to be accomplished while the component parts of the same are in assembled relationship, whereby the adjustment manipulations and the concomitant effects of same on the wheel mount may be substantially simultaneously visually monitored, whereby the longitudinal adjustment of the caster is accomplished independent of bias element resistance.

2. An adjustable caster of claim 1, comprising bias means for securing said connecting rod in a fixed longitudinal disposition relative to said shaft.

3. An adjustable caster of claim 2, said bias means comprising a jam nut disposed in threadingly fitted engagement with said shaft intermediate to said connecting rod and said wheel mount, whereby said jam nut when disposed in bias relationship to said connecting rod locks said connecting rod in a fixed position on said shaft.

4. An adjustable caster of claim 2, said sleeve having an integrally formed capped end disposed for engagement of said bias element, said connecting rod having an integrally formed neck portion and an integrally formed enlarged portion defining a shoulder therebetween, said sleeve further having an aperture dimensioned and configured for slidingly receiving said neck portion of connecting rod, said bias element comprising a spring, said spring situated in surrounding relationship to said neck portion and disposed in compressed engagement at one end to said shoulder and at the other end to the interior surface of said capped end, fastener means attached to the outer extremity of said neck portion exterior to said sleeve, fastener means having planar dimensions greater than said aperture of said capped end whereby withdrawal of said neck portion through said aperture is prevented.

5. An adjustable caster of claim 2, comprising a head member rigidly attached to the lower portion of said shaft, in exposed, implement-receiving configuration whereby rotation of said head member when said connecting rod is in a fixed position adjusts the relative spatial disposition between the same without affecting the disposition of the spring and when the caster is in assembled relationship and whereby said rotatable attachment of said shaft to said wheel mount allows for said rotatable wheel to remain stationary during such adjustment.

6. An adjustable caster of claim 5, comprising a plurality of circularly disposed ball bearings disposed between said exposed, implement-receiving head member and said wheel mount whereby the rotational relationship between the same is facilitated, a pair of opposed substantially flat indentations formed on the lower regions of said connecting rod on the exposed surfaces thereof whereby engagement of same can be facilitated, without requiring the dissassembly of the caster, whereby the visual monitoring of said engagement occurs simultaneously with the visual monitoring of the shank rotation operation and its concomitant effects on the wheel mount.

7. In combination, a plurality of spring loaded, adjustable casters and a loadable movably positionable structure, said loadable movably positionable structure including a base with at least three adjustable casters mounted thereon, said loadable movably positionable structure further including a companion leg for support of said loadable movably positionable structure disposed adjacent each said adjustable caster, each said leg being disposed in predetermined spaced-apart relationship when said loadable movably positionable structure is not stood upon and in supporting engagement with the underlying surface upon which said loadable movably positionable structure rests when the same is stood upon, each said adjustable caster comprising:

a rotatable wheel, a wheel mount for movably mounting in axial relationship said rotatable wheel, a shaft revolvably mounted to said wheel mount, external adjustment means for rotating said shaft relative to said wheel mount, a connecting rod disposed in screw-threaded engagement with said shaft, a sleeve adapted for sliding support of said connecting rods, a bias element disposed interiorly of said sleeve to provide spring-like compression between said sleeve and said connecting rod when the caster assembly is under load, said sleeve fixedly attached to the movably positionable structure, the relative spatial disposition of the connecting rod and the sleeve being fixed under no load conditions, the relative spatial disposition of the connecting rod and the sleeve being fixed when the shaft is rotated relative to the connecting rod, thereby effecting longitudinal displacement of the rotatable wheel, in the absence of bias element resistance, said external adjustment means disposed in spacial proximity with said wheel mount, whereby rotation of said shaft relative to said connecting rod effects the longitudinal adjustment of said caster while the position of the bias element remains unaffected, whereby said external adjustment means allows the adjustment of the caster to be accomplished while the component parts of the same are in assembled relationship, whereby the adjustment manipulations and the concomitent effects of same on the wheel mount may be substantially simultaneously visually monitored.

8. The combination of claim 7, said rolling ladder including four said adjustable casters, one said adjustable caster disposed in each of the corners of a rectangular said base.

9. An adjustable structure of claim 7, comprising bias means for securing said connecting rods in a fixed longitudinal disposition relative to said shaft.

10. An adjustable structure of claim 9, said bias means comprising a jam nut disposed in threadingly fitted engagement with said shaft intermediate to said connecting rod and said wheel mount, whereby said jam nut when disposed in bias relationship to said connecting rod locks said connecting rod in a fixed position on said shaft.

11. An adjustable structure of claim 10, said sleeve having an integrally formed capped end disposed for engagement of said bias element, said connecting rod having an integrally formed neck portion and an integrally formed enlarged portion defining a shoulder therebetween, said sleeve further having an aperture dimensioned and configured for slidingly receiving said neck portion of connecting rod, said bias element comprising a spring, said spring situated in surrounding relationship to said neck portion and disposed in compressed engagement at one end to said shoulder and at the other end to the interior surface of said capped end, fastener means attached to the outer extemity of said neck portion exterior to said sleeve, said fastener means having planar dimensions relative to said aperture greater than said aperture of said capped end whereby withdrawal of said neck portion through said aperture is prevented.

12. An adjustable structure of claim 9, comprising a head member rigidly attached to the lower portion of said shaft, said head member disposed in exposed implemented receiving configuration, said head means disposed in spatial proximity with said wheel mount, whereby rotation of said head member when said connecting rod is in a fixed position adjusts the relative spatial disposition between the same without affecting the disposition of the spring and while maintaining the movably positionable structure in upstanding configuration and while maintaining the caster in assembled relationship, whereby said rotatable attachment of said shaft to said wheel mount allows aforesaid rotatable wheel to remain stationary during such adjustment.

13. An adjustable caster structure of claim 12, comprising a plurality of circularly disposed ball bearings disposed between said head member and said wheel mount whereby the rotational relationship between the same is facilitated, a pair of opposed substantially flat indentations disposed on the lower regions of said connecting rod whereby engagement of same can be facilitated, said flat indentations formed on the external surfaces of said connecting rod.

14. A method of leveling a ladder having a plurality of spring loaded adjustable casters and a companion leg positioned adjacent to each of the adjustable casters, said method including the steps of:

initially adjusting a longitudinal adjustment shank on each of the casters while maintaining the ladder in upstanding configuration and while maintaining the caster in assembled relationship to provide an initial clearance between the floor supporting the ladder and the lower extremity of the adjacent leg when the casters are supporting only the tare weight of the ladder, visually monitoring said initial adjustment and substantially simultaneously visually monitoring said initial clearance, next, applying a downward vertical force to the ladder equivalent to stepping on the same, measuring the clearance between each leg and the floor while the downward vertical force is being applied to the ladder, again adjusting the longitudinal adjustment shank while maintaining the ladder in upstanding configuration and while maintaining the caster in assembled relationship on any caster in which the adjacent leg did not engage the floor when the vertical force was applied in an amount substantially equal to the measured clearance, again visually monitoring said adjustment and its concomittent effects on the measured clearance substantially simultaneously therewith, continuing applying downward vertical force followed by adjusting the longitudinal adjustment shank while maintaining the movably positionable structure in upstanding configuration and while maintaining the caster in assembled relationship until each leg is disposed in supporting engagement with the floor when having a downward vertical force on the ladder equivalent to standing on the same, continually visually monitoring, substantially simultaneously therewith, each adjustment and its concomittent effects.

15. The method for leveling a ladder of claim 14, adjusting each caster while maintaining the movably positionable structure in upstanding configuration and while maintaining the caster in assembled relationship so that the adjacent leg has a substantially identical clearance from the floor as every other leg.

continually visually monitoring, simultaneously therewith, each adjustment and its concomitant effect.

16. The method of leveling a movably positionable structure of claim 14, said step of adjusting a longitudinal adjustment shank including rotating an externally manipulatable shaft attached to the caster wheel relative to a connecting rod mounted by attachment means to the loadable movably positionable structure, locking the shaft in a fixed disposition relative to said connecting rod by rotating on the shaft a jam nut into a biasing relationship with the connecting rod.

* * * * *